US012215959B2

(12) United States Patent
Van Elburg et al.

(10) Patent No.: US 12,215,959 B2
(45) Date of Patent: Feb. 4, 2025

(54) BALLISTIC-RESISTANT CURVED MOLDED ARTICLE

(71) Applicant: Avient Protective Materials B.V., Geleen (NL)

(72) Inventors: Johann Van Elburg, Echt (NL); Matthew Craig, Stanley, NC (US); James Rogers, Stanley, NC (US)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 312 days.

(21) Appl. No.: 16/954,804

(22) PCT Filed: Dec. 12, 2018

(86) PCT No.: PCT/EP2018/084485
§ 371 (c)(1),
(2) Date: Jun. 17, 2020

(87) PCT Pub. No.: WO2019/121204
PCT Pub. Date: Jun. 27, 2019

(65) Prior Publication Data

US 2021/0088313 A1 Mar. 25, 2021

Related U.S. Application Data

(60) Provisional application No. 62/599,920, filed on Dec. 18, 2017.

(30) Foreign Application Priority Data

Jan. 11, 2018 (EP) .................................... 18151131

(51) Int. Cl.
*F41H 5/04* (2006.01)
*B32B 37/10* (2006.01)
*B32B 37/12* (2006.01)

(52) U.S. Cl.
CPC ........... *F41H 5/0485* (2013.01); *B32B 37/12* (2013.01); *B32B 37/10* (2013.01); *B32B 2262/0253* (2013.01); *B32B 2437/04* (2013.01); *B32B 2571/02* (2013.01)

(58) Field of Classification Search
None
See application file for complete search history.

(56) References Cited

U.S. PATENT DOCUMENTS 4,413,110 A 11/1983 Kavesh et al.
4,824,631 A 4/1989 Yeager
2008/0124513 A1 5/2008 Eleazer et al.
2010/0154621 A1 6/2010 Nilakantan et al.
2011/0036235 A1 2/2011 Hoefnagels et al.
2011/0256341 A1 10/2011 Geva et al.
2012/0186002 A1* 7/2012 Bhatnagar ................. B32B 5/02 2/2.5
2013/0095716 A1 4/2013 Hanks et al.
2015/0107447 A1 4/2015 Chiou
2015/0323292 A1* 11/2015 Strauss ..................... B32B 7/12 89/36.02

FOREIGN PATENT DOCUMENTS

| | | |
|---|---|---|
| CN | 1526490 | 9/2004 |
| CN | 101547787 | 9/2009 |
| CN | 101990492 | 3/2011 |
| CN | 105658423 | 6/2016 |
| EP | 0200547 | 11/1986 |
| EP | 0205960 | 12/1986 |
| EP | 0213208 | 3/1987 |
| EP | 0472114 | 2/1992 |
| EP | 1350868 | 10/2003 |
| EP | 1699954 | 11/2011 |
| EP | 3193132 | 7/2017 |
| GB | 2042414 | 9/1980 |
| GB | 2051667 | 1/1981 |
| WO | 89/01123 | 2/1989 |
| WO | WO 01/73173 | 10/2001 |
| WO | WO 2008/098771 | 8/2008 |
| WO | WO 2008/130391 | 10/2008 |
| WO | WO 2009/056286 | 5/2009 |
| WO | WO 2012/080274 | 6/2012 |
| WO | WO 2013/131996 | 9/2013 |
| WO | 2015/018909 | 2/2015 |

OTHER PUBLICATIONS

International Search Report and Written Opinion of the ISA for PCT/EP2018/084485, mailed Apr. 3, 2019, 6 pages.

* cited by examiner

*Primary Examiner* — Reginald S Tillman, Jr.

(74) *Attorney, Agent, or Firm* — NIXON & VANDERHYE P.C.

(57) ABSTRACT

The present invention provides a process for producing a ballistic-resistant curved molded article said process comprising pressing in a mold a stack comprising a plurality of layers of unidirectionally aligned polyolefin fibers substantially absent a bonding matrix and a plurality of layers of adhesive; characterized in that a means for dispersing pressure is employed against at least one surface of the stack. Also provided are a ballistic-resistant curved molded article and a press-pad having substantially the shape of a curved mold.

14 Claims, No Drawings

BALLISTIC-RESISTANT CURVED MOLDED ARTICLE

This application is the U.S. national phase of International Application No. PCT/EP2018/084485 filed 12 Dec. 2018, which designated the U.S. and claims priority to EP Patent Application No. 18151131.2 filed 11 Jan. 2018, and claims the benefit of U.S. Application No. 62/599,920 filed 18 Dec. 2017, the entire contents of each of which are hereby incorporated by reference.

The invention relates to a process for producing a ballistic-resistant curved molded article comprising a plurality of layers of unidirectionally aligned polyolefin fibers and a plurality of layers of adhesive; and to a ballistic-resistant curved molded article, for example a helmet shell, having improved performance.

Ballistic-resistant curved molded articles produced by pressing a stack of layers of unidirectionally aligned fibers embedded in a matrix are known in the art. It is also taught in the art to minimize the proportion of bonding matrix present in order to improve ballistic-resistant performance at a given areal density. The rationale proposed for this is that, while some matrix is required in order to provide mechanical integrity to the article, bonding matrix does not contribute to the projectile stopping capability; accordingly, it's presence should be minimized or even avoided.

Material with a low or even zero matrix content is known in the production of ballistic-resistant panels. For example, WO2009/056286 describes a material sheet of unidirectionally aligned polymer fibers having no matrix present, rather fibers are fused together by the application of heat and pressure to fibers wound around a plate. Perpendicular layers are wound sequentially around a plate; the plate with wound fiber layers is compressed; then the resulting two sheets of consolidated layers are removed from the plate.

Further, WO2013/131996 describes a composite panel made from tapes of a thermoplastic polymer, for example produced from fibers of ultrahigh molecular weight polyethylene, and a plastomer as adhesive. Ballistic-resistant molded articles are produced by pressing sheets formed from the tapes.

It is also known to press laminate materials in a hydroclave to produce ballistic-resistant curved molded articles. WO2008098771 describes a process for producing a ballistic-resistant helmet shell, by applying isostatic pressure through use of a hydroclave to a stack of layers of unidirectionally aligned fibers and 19 wt % binder. Such pressing in a hydroclave did not lead to an improvement in $V_{50}$ against 7.62×39 mm MSC (AK47) threat but the standard deviation of $V_{50}$ was lower compared with pressing in a conventional press. Accordingly, improvement in ballistic performance was limited against this threat.

A further drawback with the materials having a low amount of bonding matrix, as described above, is that it they are not easily pressed into a curved molded article while maintaining consistent good ballistic-resistant performance over the whole article.

An object of the present invention is therefore to provide a ballistic-resistant curved molded article having improved homogeneity of ballistic-resistant performance. A further object is an improved process for producing such a ballistic-resistant curved molded article having improved homogeneity of ballistic performance.

The present inventors have found that ballistic-resistant properties of a curved molded article produced from a stack of material sheets having a low matrix content are improved when pressing conditions used to press the stack of layers are homogenous. Accordingly, the present invention provides a process for producing a ballistic-resistant curved molded article said process comprising pressing in a mold a stack comprising a plurality of layers of unidirectionally aligned polyolefin fibers substantially absent a bonding matrix and a plurality of layers of adhesive; characterized in that a means for dispersing pressure is employed against at least one surface of the stack.

The present invention further provides a ballistic-resistant curved molded article, which article comprises a plurality of layers of unidirectionally aligned polyolefin fibers which layers are substantially absent a bonding matrix; and a plurality of layers of adhesive, which ballistic-resistant curved molded article has an areal density of at most 11 $Kgm^{-2}$ and meets NIJ level $III^{+}$ performance against 7.62×39 mm MSC (AK47).

The present invention further provides a press-pad having substantially the shape of a pressing surface of a curved mold.

The present invention further provides a ballistic-resistant curved molded article obtainable by a process as defined herein.

As used herein a "curved" molded article is a non-planar molded article. It has a three-dimensional, rather than two-dimensional form. The article may have single or multiple curves.

As used herein, "pressing in a mold" means that at least one mold part is used. The term therefore encompasses pressing against one mold part, for example a male mold part or a female mold part. The term also encompasses pressing between a male mold part and a female mold part.

As used herein the term "a plurality" means an integer greater than 1.

As used herein the term "unidirectionally aligned" means fibers in a layer are orientated substantially parallel to one another, in the plane defined by the layer.

As used herein the term "substantially absent a bonding matrix" means that a layer of fibers may include a trace amount of a bonding matrix provided that the trace is materially insignificant. Substantially absent a bonding matrix typically means that the layer comprises at most 1.0 wt. % bonding matrix. In other words, the layer is essentially free of a bonding matrix. Preferably, substantially absent means absent.

As used herein the term "absent a bonding matrix" means containing 0.0 wt. % bonding matrix based on the weight of the layer. Accordingly, the layers comprising unidirectionally aligned polyolefin fibers are preferably free from a bonding matrix; in other words, a bonding matrix is completely absent. A layer of adhesive is distinct from a layer of unidirectionally aligned drawn polyolefin fibers. The layers comprising unidirectionally aligned polyolefin fibers may comprise mechanically fused unidirectionally aligned polyolefin fibers.

As used herein, the term "bonding matrix" refers to substances other than the fiber itself, which act to bond fibers together.

As used herein, the term "means for dispersing pressure", refers to any physical medium capable of distributing pressure more evenly or more homogeneously over the surface of the stack. Specifically, a means for dispersing pressure excludes a mold part. In other words the term "means for dispersing pressure", refers to any physical medium capable of distributing pressure more evenly, or more homogeneously, compared with a mold part, over the surface of the stack. The means for dispersing pressure typically has a lower Shore A hardness than a mold part.

As used herein, "employed against at least one surface" means that the means for dispersing pressure is positioned at said surface, but not necessarily in direct contact with said surface, such that pressure is applied to the surface through the means. The means for dispersing pressure is located between a means for applying pressure and said surface.

As used herein, a "filler ply", means a layer present in the stack which layer does not fully cover the area of the stack present in the curved ballistic-resistant molded article. For example, the filler ply may have an area smaller than that of the stack which is incorporated into the curved ballistic-resistant molded article.

As used herein the term "precursor sheet" refers to an intermediate multilayered material sheet suitable for forming the ballistic-resistant molded article.

As used herein "melting point" refers to the temperature at which the main peak of a differential scanning calorimetry (DSC) second heating curve (carried out at a heating rate of 10° C./min) of the fibers occurs.

Within the context of the present application, a fiber is an elongated body with length dimension much greater than its width and thickness. The term fiber thus includes a monofilament, a multifilament yarn, a ribbon, a strip or tape and the like. A layer comprising strips or tapes may abut or overlap. A fiber can have any cross-sectional shape. The cross section may vary along the length of the fiber. Typically, a fiber is a monofilament. Typically, the fiber has a cross sectional aspect ratio, defined by the ratio of the largest dimension between two points on the perimeter of a cross-section of the fiber and the lowest dimension between two points on the same perimeter of less than 5:1, preferably of at most 3:1; more preferably less than 2:1.

Good results may be obtained when the polyolefin fibers are polyethylene fibers. Suitable polyolefins are in particular homopolymers and copolymers of ethylene and propylene, which may also contain small quantities of one or more other polymers, in particular other alkene-1-polymers. Preferred polyethylene fibers are high and ultrahigh molecular weight polyethylene ([U]HMWPE) fibers.

Polyethylene fibers may be manufactured by any technique known in the art, preferably by a melt or a gel spinning process. Most preferred fibers are gel spun UHMWPE fibers, e.g. those sold by DSM Dyneema, Heerlen, Netherlands, under the name Dyneema®. If a melt spinning process is used, the polyethylene starting material used for manufacturing thereof preferably has a weight-average molecular weight between 20,000 and 600,000 g/mol, more preferably between 60,000 and 200,000 g/mol. An example of a melt spinning process is disclosed in EP 1,350,868 incorporated herein by reference. If the gel spinning process is used to manufacture said fibers, preferably an UHMWPE is used with an intrinsic viscosity (IV, as determined according to ASTM 1601 and preferably as described with respect to the examples, on solutions in decalin at 135° C.) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE fibers are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fiber Spinning Technology*", Ed. T. Nakajima, Woodhead Publ. Ltd (1994), ISBN 185573 182 7.

Fibers from these polyolefins are preferably highly oriented by drawing at a suitable temperature, to obtain a drawn polyolefin fiber. Drawing is typically carried out elevated temperature, below the melting point of the fiber. The polyolefin fiber is preferably a drawn polyolefin fiber.

The tensile strength of the polyolefin fibers is preferably at least 1.2 GPa, more preferably at least 2.5 GPa, most preferably at least 3.5 GPa. The tensile modulus of the polyolefin fibers is preferably at least 5 GPa, more preferably at least 15 GPa, most preferably at least 25 GPa. Best results were obtained when the polyolefin fibers were UHMWPE fibers having a tensile strength of at least 2 GPa, more preferably at least 3 GPa and a tensile modulus of preferably at least 50 GPa, more preferably of at least 90 GPa, most preferably at least 120 GPa.

A layer of unidirectionally aligned polyolefin fibers which layer is substantially absent a bonding matrix is typically formed from fusing of fibers. Fusing is preferably achieved under a combination of pressure, temperature and time which results in substantially no melt bonding. Preferably, there is no detectable melt bonding as detected by DSC (10° C./min). No detectable melt bonding means that no visible endothermic effect consistent with partially melted recrystallized fibers is detected, when the sample is analyzed in triplicate. Preferably, fusing is mechanical fusing. Mechanical fusing is thought to occur by deformation of fibers leading to increased mechanical interlocking of parallel fibers and increased van der Waals interaction between fibers. Accordingly, the fibers within a layer are typically fused. Therefore, the layer may have good structural stability without any bonding matrix or adhesive being present. Further, it may have good structural stability without any melting of fibers.

A layer of unidirectionally oriented polyolefin fibers substantially absent a bonding matrix may be formed by subjecting a parallel array of filaments to elevated temperature and pressure. The means for applying pressure may be a calender, a smoothing unit, a double belt press or an alternating press. A preferred manner of applying pressure is by introducing an array of unidirectionally oriented fibers to the nip of calender, substantially as described in WO 2012/080274 A1.

Preferably, the thickness of the layer comprising unidirectionally aligned polyolefin fibers is at least 1.0, more preferably at least 1.3, most preferably at least 1.5 times the thickness of an individual polyolefin fiber. If polyolefin fibers with different thicknesses are used, by the thickness of an individual fiber is herein understood an average thickness of the utilized fibers. Preferably, the maximum thickness of said layer is no more than 20, more preferably no more than 10, even more preferably no more than 5 and most preferably no more than 3 times the thickness of an individual polyolefin fiber.

The mechanical properties of the layers of unidirectionally aligned polyolefin fibers of the invention are typically similar to the mechanical properties of the fibers utilized to manufacture thereof. The tensile strength of a layer of unidirectionally aligned polyolefin fibers is preferably at least 1 GPa, more preferably at least 2 GPa, most preferably at least 3 GPa. The tensile modulus of the layer of unidirectionally aligned polyolefin fibers is preferably at least 40 GPa, more preferably at least 80 GPa, more preferably at least 100 GP.

Typically, a layer of unidirectionally aligned polyolefin fibers has a thickness of from 10 to 200 μm. Preferably, the thickness is from 25 to 120 μm; more preferably the thickness is from 35 to 100 μm. Thickness of a layer may be measured by taking an average of three measurements, for example using microscopy.

A stack is formed from a number of precursor sheets. The stack may comprise only identical precursor sheets, or a mixture of different precursor sheets. Typically, the total amount of adhesive present in the stack is less than 12.0 wt. % based on the weight of the stack. Preferably, the total amount of adhesive present is from 6.0 to 11.0 wt. % based on the total weight of the stack. More preferably, the total amount of adhesive present is from 7.0 to 10.5 wt. %; more preferably from 7.5 to 10.0 wt. %; most preferably from 8.0 to 9.5 wt. % based on the total weight of the stack.

The term adhesive refers to a material that adheres adjacent layers of unidirectionally aligned fibers together. The adhesive provides structural rigidity to the precursor sheet of the present invention. It also acts to improve inter-layer bonding between adjacent layers of unidirectionally aligned fibers in the molded article of the present invention. In the molded article of the present invention, the adhesive forms a layer between adjacent layers of unidirectionally aligned fibers. The adhesive may completely cover a surface of an adjacent layer of unidirectionally aligned fibers or it may only partially cover said surface. The adhesive can be applied in various forms and ways; for example as a film, as transverse bonding strips or transverse fibres (transverse with respect to the unidirectional fibres), or by coating the layer of unidirectionally aligned fibres, e.g. with a polymer melt or a solution or dispersion of a polymer material in a liquid. Preferably, the adhesive is homogeneously distributed over the entire surface of the layer, whereas a bonding strip or bonding fibres can be applied locally.

A suitable adhesive includes a thermosetting polymer or a thermoplastic polymer, or a mixture of the two. Thermosetting polymers include vinyl esters, unsaturated polyesters, epoxides or phenol resins. Thermoplastic polymers include, polyurethanes, polyvinyls, polyacrylics, polyolefins, polybutyleneterephthalate (PBT), or thermoplastic elastomeric block copolymers such as polystyrene-polybutylene-polystyrene or polystyrene-polyisoprene-polystyrene block copolymers. From the group of thermosetting polymers, vinyl esters, unsaturated polyesters, epoxides or phenol resins are preferred.

A preferred thermoplastic polymer comprises a copolymer of ethylene which may contain as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate. In the absence of co-monomer in the polymeric resin, a wide variety of polyethylene may be present, for example linear low density polyethylene (LLDPE), very low density polyethylene (VLDPE), low density polyethylene (LDPE), or blends thereof. However, high density polyethylene (HDPE) is preferred.

One particularly preferred thermoplastic polymer comprises a copolymer of ethylene and acrylic acid (ethylene acrylic acid copolymer); or a copolymer of ethylene and methacrylic acid (ethylene methacrylic acid copolymer). Preferably, said adhesive is applied as an aqueous suspension.

An alternative particularly preferred thermoplastic polymer is a plastomer wherein said plastomer is a random copolymer of ethylene or propylene and one or more $C_2$ to $C_{12}$ α-olefin co-monomers. More preferably, the thermoplastic polymer is a homopolymer or copolymer of ethylene and/or propylene.

The melting point of the adhesive is below that of the polyolefin fibers. Typically, the adhesive has a melting point below 155° C. Preferably it is from 115° C. to 150° C.

Typically, in the process of the present invention, the total amount of adhesive present in the ballistic-resistant curved molded article is less than 15.0 wt. % based on the total weight of the molded article. Typically, the total amount of adhesive present in the ballistic-resistant curved molded article is less than 15.0 wt. % based on the total weight of the molded article. Preferably the total amount of adhesive present is less than 12.0 wt. % based on the total weight of the molded article. More preferably, the total amount of adhesive present is from 6.0 to 11.0 wt. % based on the total weight of the ballistic-resistant panel. Yet more preferably, the total amount of adhesive present is from 7.0 to 10.5 wt. %; more preferably from 7.5 to 10.0 wt. %; most preferably from 8.0 to 9.5 wt. % based on the total weight of the ballistic-resistant molded article.

The adhesive typically does not penetrate substantially into the layers of unidirectionally aligned polyolefin fibers. Preferably, the adhesive does not penetrate at all into the layers of unidirectionally aligned polyolefin fibers. Accordingly, the adhesive does not act as a bonding agent between fibers within a single layer of unidirectionally aligned fibers. Preferably, the ballistic-resistant molded article comprises a plurality of layers of unidirectionally aligned polyolefin fibers which layers are substantially absent a bonding matrix; and a plurality of layers of adhesive.

Typically, the ballistic-resistant molded article comprises at least 5, preferably at least 10 layers of unidirectionally aligned polyolefin fibers which layers are substantially absent a bonding matrix. Typically, the ballistic-resistant molded article comprises at least 5, preferably at least 10 layers of adhesive.

In the ballistic-resistant article of the present invention the adhesive layer may comprise a complete layer, for example a film; a continuous partial layer, for example a web; or a disperse partial layer, for example spots or islands of adhesive.

Preferably, each layer of unidirectionally aligned polyolefin fibers is oriented at an angle of from 45° to 135° with respect to the orientation of an adjacent layer of unidirectionally aligned polyolefin fibers. A preferred angle is 75° to 105°; for example about 90°. Preferably, each layer of unidirectionally aligned polyolefin fibers is separated from an adjacent layer of unidirectionally aligned polyolefin fibers by a layer of adhesive.

Typically, a means for dispersing pressure is employed against two surfaces of the stack. In the case where a curved mold comprising a male mold part and a female mold part is used, a press-pad may be situated between each of the male mold part and one surface of the stack comprising a plurality of layers and the female mold part and the opposite surface the stack comprising a plurality of layers. In the case where an autoclave, hydroclave or diaphragm molding machine is used, a press-pad may be situated between one mold part and one surface of the stack comprising a plurality of layers. The means for dispersing pressure employed against the opposite side of the stack comprising a plurality of layers may be, respectively, the gas, liquid or diaphragm of the autoclave, hydroclave or diaphragm molding machine.

Typically, the means for dispersing pressure is a press-pad. A press-pad is known in the art for pressing flat panels in a press. The press-pad should be separable from the material sheets after pressing. It should be hard enough that it deforms under pressing conditions but not too much. It should not melt under pressing conditions. A typical Shore A hardness value for a press-pad is from 20 to 80. Preferably a Shore A hardness value is from 30 to 70, more preferably 40 to 60. Most preferably a Shore A hardness value of a press-pad is about 50. Any suitable material for a press-pad may be used. Typical materials include plastic and elastic polymers. Elastomeric polymers are preferred. A particularly preferred material for the press-pad is a silicone. The press-pad may be single use or multiple use. That is, it may be damaged in the process of pressing or it may survive with sufficient properties to be usable several times. A suitable thickness for the press-pad is from 1 mm to 5 mm, for example from 1.5 mm to 3.5 mm, preferably from to 3 mm.

The press-pad of the present invention has substantially the shape of a pressing surface of a curved mold. By this is meant that the press-pad is at least non-planar, and is curved in the same direction(s) as the pressing surface of the mold. Preferably, it has a shape corresponding to that of the pressing surface of the mold. Such a press-pad may be formed in any suitable way, depending on the material of the press-pad. For example, it may be injection molded in a mold having substantially the same shape as the mold in which it will be used, or actually in the mold in which it will be used. Alternatively, it may be draped over the mold part and stretched, optionally under heating. Another way to form the press-pad is to cut and dart a flat sheet of suitable material. Alternatively, it may be applied as a liquid or aerosol on a surface of a mold.

Alternatively, the means for dispersing pressure is a fluid in any one of an autoclave, a hydroclave or a diaphragm molding machine. The term fluid as used herein comprises liquid and gas. An autoclave comprises a pressure chamber and a pump used to apply elevated temperature and pressure with gas. A stack is placed against a mold part, placed in the autoclave and a gas is pressurized to effect pressing on the stack. The mold part may be male or female. A homogeneous pressure is applied across the surface of the stack due to the fluid nature of the gas; accordingly the gas is a means for dispersing pressure.

A hydroclave uses a liquid instead of a gas. A stack is placed against a mold part, placed in the autoclave and a liquid is pumped into the hydroclave and pressurized to effect pressing on the stack. The mold part may be male or female. A homogeneous pressure is applied across the surface of the stack due to the fluid nature of the liquid; accordingly the liquid is a means for dispersing pressure. The liquid may be oil or water. The use of water does not practically limit the available temperature range for consolidating the stack, since consolidating is carried out at high to very high pressures, at which level the boiling temperature of water is significantly above 100° C.

A diaphragm molding machine uses a pressurized fluid to exert pressure through a flexible diaphragm, membrane or bladder onto the stack of layers to be molded. The stack may be held in a male or female mold, such that the diaphragm, membrane or bladder forms respectively the female or male part of the mold. The fluid, in combination with the flexible diaphragm, acts to apply a homogeneous pressure to the stack of layers; accordingly the diaphragm is a means for dispersing pressure.

An autoclave and a hydroclave may be referred to as applying isostatic pressure. Accordingly, the means for dispersing pressure may be a means for applying isostatic pressure. Isostatic pressure is intended to mean pressurizing a stack of layers to equal pressure from every side. Typically, with an autoclave or hydroclave, the stack is sealed under reduced pressure in a bag.

The temperature of pressing is typically at least 3° C. below the melting point of the polyolefin; more preferably it is at least 5° C. below the melting point of the polyolefin fiber; most preferably at least 10° C. below the melting point of the polyolefin fiber. The melting point of the polyolefin fiber is determined by DSC as described herein. Preferably, the pressing pressure is at least 10 MPa. More preferably, the pressing pressure is at least 12 MPa; yet more preferably at least 15 MPa. Whilst the theoretical upper pressure limit may be higher, in practice the pressing pressure is at most 30 MPa. The pressed stack is typically cooled under pressure. Maintaining pressure until the pressed stack is cooled ensures that the layers of unidirectionally aligned polyolefin fibers adhere well. In particular, it prevents relaxation of the layer as the pressure is reduced. Preferably cooling under pressure is carried out to below 80° C. Preferably, the pressure applied during pressing is maintained during cooling. Alternatively, a lower pressure may be applied.

Typically, in the process of the present invention, the ballistic-resistant curved molded article comprises at least one filler ply. A filler ply may have an area smaller than that of the stack which is incorporated into the curved ballistic-resistant molded article. A filler ply is commonly used in the production of helmets utilizing the deep-draw technique. One or more filler plies of a reinforcing material are typically added having an area smaller than that of the stack incorporated into the helmet. Typically, a filler ply is substantially circular. Typically, in the case of a dome or helmet shell, a filler ply is placed such that it is at the crown thereof. Accordingly, the edge of a filler ply is incorporated into the ballistic-resistant curved molded article. A filler ply may be used to impart properties other than improved ballistic-resistant performance to the molded article. For example, it might improve rigidity or impact-resistance. Alternatively, or additionally, it may be added to provide added thickness. A filler ply may be of a different material to the stack of fibers. For example, it may comprise fiber reinforced resin. Typical fibers are carbon fibers or glass fibers. A filler ply may be used in any ballistic-resistant curved molded article. Typically, the ballistic-resistant curved molded article comprises at least one filler ply.

As mentioned above, a particular problem occurs with the use of filler plies in that at the edge of the ply the areal density of the stack changes by one layer. This leads to a change in pressure experienced by the stack of layers during molding. The process of the present invention mitigates this problem by ensuring a more homogeneous pressure is exerted over the surface of the area to be consolidated, than would be applied by a mold part. Accordingly, the pressure applied is smoothed over the edge of the filler ply.

A ballistic-resistant curved molded article of the present invention or produced by the process of the present invention is a form of hard ballistic material. It is suitable for use in an insert in ballistic-resistant clothing; as the shell of a helmet for personal protection; in armor for vehicle protection; or as a radome. It may also be suitable as a part for a ballistic resistant helmet, for example an appliqué or a mandible. Typically, inserts in ballistic clothing are curved in one or two directions. For example, a chest plate insert may be curved slightly in two directions. Vehicle armor may be curved in one or two directions. A radome may be curved in one or two directions; it may be for example dome-shaped. A helmet shell is curved to a large degree in two directions. Typically, the ballistic-resistant curved molded article is a helmet shell or a radome.

A particularly preferred embodiment of the present invention is a ballistic-resistant helmet shell, which helmet shell comprises a plurality of layers of unidirectionally aligned polyolefin fibers which layers are substantially absent a bonding matrix; a plurality of layers of adhesive; and at least one filler ply, which helmet shell has an areal density of at most 11 $Kgm^{-2}$ and meets NIJ level $III^{+}$ performance against 7.62×39 mm MSC (AK47), and wherein total amount of adhesive present in the helmet shell is less than 15.0 wt. % based on the total weight of the helmet shell.

Particularly preferred is a process for producing a ballistic-resistant helmet shell said process comprising pressing in a mold a stack comprising a plurality of layers of unidirectionally aligned polyolefin fibers substantially absent a bonding matrix and a plurality of layers of adhesive and wherein total amount of adhesive present in the helmet shell is less than 15.0 wt. % based on the total weight of the helmet shell; characterized in that pressure is applied to at least one surface of the stack through a press-pad, and the pressure applied is at least 8 MPa and is followed by cooling under while maintaining the same pressure.

Typically, during consolidation of a stack of layers of fibers embedded in a matrix according to the prior art, heat is applied sufficient to soften or (at least partially) melt the matrix. The matrix then flows around the fibers to bind adjacent layers. In addition, the matrix can flow in response to uneven pressure caused by irregularities in the material, compared with the gap in the mold being pressed; i.e. matrix will flow from areas of high pressure to areas of low pressure. Irregularities may arise from gaps between adjacent sheets of material in the same layer, defects caused by air bubbles or simply irregular areal density of fibers.

The curved shape of the ballistic-resistant molded article can give rise to unequal pressure being applied across the surface of the article. Where the stack of precursor sheets has a low matrix content or adhesive layers separated by fiber layers, the matrix is unable to flow adequately to homogenize the pressure applied. This causes the stack to experience inhomogeneous pressure during pressing and accordingly results in homogeneous consolidation. Such inhomogeneity may be visible by placing a molded article on a light table. Dark regions indicate poor consolidation, and lead to poor ballistic-resistance.

In the production of particularly highly curved molded articles, for example helmet shells or dome-shaped radomes, essentially two types of inhomogeneity may be deliberately introduced. One technique for the production of helmet shells or dome-shaped radomes involves the "flower-cut" design, wherein v-shaped cuts are made from the circumference of circular material sheets and the sheets folded to form a dome. A second technique is "deep draw" where layers are stretched by pressing in to a mold. This results in thinner areas of the helmet shell, for example at the crown. Typically, filler plies are added in order to increase the thickness at this area. In both of these designs, edges of plies exist in the molded area, creating a step-change in thickness. In a material according to the prior art where fibers are embedded in a matrix, the matrix will typically flow to even out the step, and enable substantially even pressure to be experienced. A problem occurs on pressing material where insufficient matrix is available to flow, which will give rise to inhomogeneous pressing and inhomogeneous consolidation. In a ballistic-resistant article, this will result in lower ballistic performance at points of lower consolidation.

The stack of layers may comprise a stack of precursor sheets. A precursor sheet comprises at least one layer of polyolefin fibers and at least one layer of adhesive. Typically a precursor sheet comprises an equal number of layers of unidirectionally aligned polyolefin fibers substantially absent a bonding matrix and layers of adhesive. Typically, a precursor sheet comprises from 2 to 8 layers of unidirectionally oriented polyolefin fibers, preferably 2 or 4. Typically, a precursor sheet comprises from 2 to 8 layers of adhesive, preferably 2 or 4. Typically, said precursor sheet comprises only layers of unidirectionally oriented polyolefin fibers substantially absent a bonding agent and layers of adhesive. Preferably, each layer of unidirectionally aligned polyolefin fibers is oriented at an angle of from 45° to 135° with respect to the orientation of the unidirectionally aligned polyolefin fibers of an adjacent layer of polyolefin fibers. A preferred angle is 75° to 15°; for example about 90°. Preferably each layer of unidirectionally aligned polyolefin fibers is separated from an adjacent layer of unidirectionally aligned polyolefin fibers by a layer of adhesive.

Typically, the precursor sheet is produced by applying an adhesive to a layer of unidirectionally aligned polyolefin fibers which layer is substantially absent a bonding matrix.

Typically, a precursor sheet comprising one layer of polyolefin fibers and one layer of adhesive has an areal density of from 25 to 150 $gm^{-2;}$ preferably from 35 to 100 $gm^{-2}$; more preferably from 45 to 75 $gm^{-2}$. Typically, a precursor sheet comprising two layers of polyolefin fibers and two layers of adhesive has an areal density of from 50 to 300 $gm^{-2}$; preferably, from 70 to 200 $gm^{-2}$; more preferably from 90 to 150 $gm^{-2}$.

Typically, a curved molded article of the present invention comprises from 20 to 480 layers of unidirectionally oriented polyolefin fibers. Preferably, it combines from 60 to 360 layers; more preferably from 100 to 240 layers. The number of layers required depends on the application and the ballistic threat to be defended against.

The areal density of the ballistic-resistant curved molded article will depend on the number of layers and areal density of the layers selected. Areal density of the ballistic-resistant curved molded article produced by the process of the present invention is typically from 1 to 100 $Kgm^{-2}$. Preferably, a curved molded article has an areal density of from 5 to 50 $Kgm^{-2}$. More preferably, it has an areal density of from 7 to 20; most preferably from 8 to 15 $Kgm^{-2}$.

The ballistic-resistant curved molded article of the present invention may comprise a film at one or both faces. Such a film has the property of protecting the surface from scratching or abrasion. Suitable films include thin films, for example of less than 20, less than 15 or even less than 10 micron thick, made from thermoplastic polymers, for example polyolefins, e.g. polyethylene, polypropylene or their copolymers; polytetrafluoroethylene; polyesters, polyamides, or polyurethanes, including thermoplastic elastomeric versions of said polymers. However, typically, said ballistic-resistant curved molded article comprises only layers of unidirectionally oriented polyolefin fibers substantially absent a bonding agent and layers of adhesive.

The ballistic-resistant molded article of the present invention may have improved specific energy of absorption ($E_{abs}$ or SEA), back-face deformation, or delamination, or a combination thereof. In particular specific energy of absorption ($E_{abs}$ or SEA) against rifle threats, for example 7.62×39 mm MSC (AK47) or SS109, of a molded article has been found to be particularly good.

A ballistic-resistant molded article of the present invention has an areal density of at most 11 $Kgm^{-2}$ and said molded article meets NIJ level $III^{+}$ performance against 7.62×39 mm MSC (AK47). More preferably, a ballistic-resistant molded article of the present invention has an areal density of at most 10 $Kgm^{-2}$; or even at most 9 $Kgm^{-2}$ and said molded article meets NIJ level $III^{+}$ performance against 7.62×39 mm MSC (AK47).

A ballistic-resistant molded article according to the present invention typically has an $E_{abs}$ of at least 205 $JKg^{-1}m^2$ against 7.62×39 mm MSC (AK47). However, a ballistic-resistant molded article may be produced with an $E_{abs}$ of at least 240, more preferably at least 280, at least 300 or even at least 330 $JKg^{-1}m^2$ against 7.62×39 mm MSC (AK47). $E_{abs}$ is typically determined at 9.8 $Kgm^{-2}$.

A ballistic-resistant molded article as described herein may be combined with one or more further layers of ballistic-resistant material. Such further ballistic-resistant material includes a polymer ballistic-resistant material or an inorganic ballistic-resistant material. A polymer ballistic-resistant material typically comprises high strength fibers, for example para-aramid or ultrahigh molecular weight polyethylene fibers. Typically, if a polymer ballistic-resistant material is present it is placed away from the strike face of the ballistic-resistant molded article.

A further layer of ballistic-resistant material may alternatively be a sheet of inorganic material selected from the group consisting of ceramic; metal; metal alloys; glass; graphite, or combinations thereof. Particularly preferred is metal, for example aluminum, magnesium, titanium, copper, nickel, chromium, beryllium, iron and copper including their alloys. The thickness of the inorganic sheet can vary within wide ranges and is preferably between 1 mm and 50 mm, more preferably between 2 mm and 30 mm. Typically, if an inorganic ballistic-resistant material is present it is positioned at the strike face of the ballistic-resistant molded article.

The further ballistic-resistant material may be adhered to the ballistic-resistant molded article or may be separate. Adhesion may be achieved by pressing, with or without the presence of a further adhesive. Such adhesive may comprise an epoxy resin, a polyester resin, a polyurethane resin or a vinylester resin. In another preferred embodiment, the bonding layer may further comprise a woven or non-woven layer of inorganic fiber, for instance glass fiber or carbon fiber.

Test methods as referred to in the present application, are as follows:

IV: the Intrinsic Viscosity is determined according to method ASTM D1601 at 135° C. in decalin, the dissolution time being 16 hours, with DBPC as anti-oxidant in an amount of 2 g/l solution, by extrapolating the viscosity as measured at different concentrations to zero concentration;

Tensile properties (measured at 25° C.): tensile strength (or strength) and tensile modulus (or modulus) are defined and determined on multifilament yarns as specified in ASTM D885M, using a nominal gauge length of the fiber of 500 mm, a crosshead speed of 50%/min. On the basis of the measured stress-strain curve the modulus is determined as the gradient between 0.3 and 1% strain. For calculation of the modulus and strength, the tensile forces measured are divided by the titre, as determined by weighing 10 metres of fiber; values in GPa are calculated assuming a density of 0.97 $g/cm^3$. Tensile properties of thin films were measured in accordance with ISO 1184(H).

Ballistic performance of molded articles is determined by calculating the $V_{50}$ value on 400 mm×400 mm sample by shooting six shots in a spread pattern at each sample, with the sample suspended in air. Shots are placed at least three inches from the edges of the sample and at least 2 inches away from previous shots. The $V_{50}$ was calculated from 4 samples. Ammunition used is 7.62×39 mm MSC (AK47).

$V_{50}$ is measured by taking the mean value of the lowest two penetration and the highest two non-penetration velocities, as defined at Lightweight Ballistic Composites, Military and Law Enforcement Applications, Bhatnagar, 2006, Woodhead Publishing Limited. Page 29.

$E_{abs}$ is calculated from $V_{50}$ using the mass of the ammunition and the areal density of the material.

EXAMPLES

Reference Experiment 1a) and b)

400 mm×400 mm sheets of unidirectionally aligned fiber layers, available as HB210 from DSM Dyneema, Heerlen, Netherlands, were stacked to form an assembly having an areal density of 13.0 $Kgm^{-2}$. The sheets each comprised 4 layers, each layer comprising unidirectionally aligned fibers of UHMWPE embedded in a matrix of 17% of a polyurethane resin, and layered in the configuration of fiber direction 0°/90°/0°/90°. In total, 96 sheets were used, with the alternating 0°/90° direction of adjacent layers maintained throughout the stack. The assembly of sheets was pressed at either a) 16.5 MPa or b) 31.7 MPa, in each case at 125° C. for 40 minutes followed by a cooling period of 20 min at 2 MPa. A molded article having an areal density of 13.0 $Kgm^{-2}$ resulted. The molded article was shot with a 7.62×39 mm MSC (AK47) bullet in order to determine $E_{abs}$.

Reference Experiment 2a) and b)

A precursor sheet was produced from 40 yarns of Dyneema® SK76 1760 dtex yarn, available from DSM Dyneema, Heerlen, Netherlands. Yarn was unwound from bobbins on a tension controlled creel and passed through a reed. Subsequently the yarns were spread to form a gap-less bed of filaments with a width of 320 mm by feeding the yarns over a spreading unit. The spread yarns were then fed into a calender. The rolls of the calender had a diameter of 400 mm and the applied line pressure was 2000N/cm. The line operated at a line speed of 8 m/min and at a roll surface temperature of 154° C. In the calender the yarns were fused into a fibrous tape. The tape was removed from the calender by the first roller-stand. A powder scattering unit was placed between the calender and the first roller-stand applying 7 wt. % Queo 1007 powder, available form Borealis, Vienna, Austria to the upper surface of the tape. The tape with powder was calendered at elevated temperature and wound onto a roller stand.

A fibrous tape with a width of 320 mm and a thickness of 46 μm was obtained. The fibrous tape had a tenacity of 35.4 cN/dTex and a modulus of 1387 cN/dTex.

Five of said tapes were aligned in parallel and abutting to form 1600 mm wide sheet. A second, identical, sheet of five tapes was formed on top of the first sheet, with the adhesive layers of both sheets facing upwards, but with the fibers of adjacent sheets aligned perpendicularly. A two-layered, cross-plied precursor sheet having an areal density of 95 $gm^{-2}$ resulted. This precursor sheet was cut into 400 mm×400 mm square precursor sheet. Multiple square precursor sheets were stacked, making sure the alternating 0°/90° direction of the tape layers was maintained. The stack of precursor sheets was processed into a molded article of 9.8 $Kgm^{-2}$. The molded article contained 103 square precursor sheets (206 layers of unidirectional aligned tapes). The stack of precursor sheets was pressed into a molded article at either a) 16.5 MPa or b) 31.7 MPa, in each case at 145° C. for 40 minutes followed by a cooling period of 20 min at 2 MPa.

The molded article was shot with a 7.62×39 mm MSC (AK47) bullet in order to determine $E_{abs}$.

Comparative Experiment A

Reference Experiment 1a) was repeated, except that, before stacking the 4-layer sheets, in five of said 4-layer sheets, six squares of 5 cm×5 cm were cut, evenly distributed over the area of the sheet with 2 edges parallel to the fiber directions. The cut squares in each of the five sheets were in the same position such that when stacked the cut squares were superimposed. Molded articles were pressed as described in Reference Experiment 1. The molded article was shot with a 7.62×39 mm MSC (AK47) bullet in order to determine $E_{abs}$. The article was shot each time at the center of the area of one of the cut squares. The obtained $E_{abs}$ expressed as a percentage of the $E_{abs}$ of Reference Experiment 1a) is given in Table 1.

Comparative Experiment B

Comparative Experiment A was repeated except that pressing was carried out at 31.7 MPa. Further, a press-pad was used on one side used during pressing. The press-pad was made of silicone having a Shore A hardness of 50+/−5 and was 1.6 mm thick. $E_{abs}$ expressed as a percentage of the $E_{abs}$ of Reference Experiment 1b) is given in Table 1.

Comparative Experiment C

Reference Experiment 2a) was repeated, except that, before stacking the 2-layer precursor sheets, in six of said 2-layer precursor sheets, six squares of 5 cm×5 cm were cut, evenly distributed over the area of the sheet with 2 edges parallel to the fiber directions. The cut squares in each of the six precursor sheets were in the same position such that when stacked the cut squares were superimposed. Panels were pressed as described in Comparative Experiment 2a). The molded article was shot with a 7.62×39 mm MSC (AK47) bullet in order to determine $E_{abs}$. The article was shot each time at the center of the area of the cut squares. The obtained $E_{abs}$ expressed as a percentage of the $E_{abs}$ of Reference Experiment 2a) is given in Table 1.

Comparative Experiment D

Comparative Experiment C was repeated except that pressing was carried out at 31.7 MPa. Further, $E_{abs}$ expressed as a percentage of the $E_{abs}$ of Reference Experiment 2b) is given in Table 1.

Example 1

Comparative Experiment D was repeated except that a press-pad was used on one side during pressing. The press-pad was made of silicone having a Shore A hardness of 50+/−5 and was 1.6 mm thick. $V_{50}$ expressed as a percentage of the $V_{50}$ of Reference Experiment 2b) is given in Table 1.

| Example No. | Areal density [Kgm$^{-2}$] | Pressure [MPa] | Means for increasing homogeneity | Comparison with Ref. Ex. | $E_{abs}$ Performance v Ref. Ex. (AK47) [%] |
|---|---|---|---|---|---|
| Comp. Ex. A | 13.0 | 16.5 | None | Ref. Ex. 1a) | 58 |
| Comp. Ex. B | 13.0 | 31.7 | 2 mm silicone press-pad | Ref. Ex. 1b) | 92 |
| Comp. Ex. C | 9.8 | 16.5 | None | Ref. Ex. 2a) | 25 |
| Comp. Ex. D | 9.8 | 31.7 | None | Ref. Ex. 2b) | 41 |
| Ex. 1 | 9.8 | 31.7 | 2 mm silicone press-pad | Ref. Ex. 2b) | 92 |

The results against 7.62×39 mm MSC (AK47) threat show that significant reduction in $E_{abs}$ occurs when areal density is varied, shown by introducing cut squares into the stack of layers compared with material having uniform areal density. The material of Comparative Examples D and especially C show a more significant reduction than Comparative Example B. Use of the press-pad when pressing at 31.7 MPa (Example 1 and Comparative Example B) provides a $E_{abs}$ of the area of the cut squares almost as high as the corresponding material without squares cut (Reference Examples 1 b and 2b). Proportionally, this improvement is more pronounced for Example 1 (over Comparative Example C) than for Comparative Example B (over Comparative Example A).

The invention claimed is:

1. A process for producing a ballistic-resistant curved molded article, said process comprising the steps of:
(a) providing a mold defining a curved pressing surface;
(b) pressing in the mold a stack comprising:
a plurality of layers of unidirectionally aligned polyolefin fibers substantially absent a bonding matrix; and
a plurality of layers of adhesive disposed between adjacent layers of the unidirectionally aligned fibers, and
(c) positioning a pressure dispersing medium capable of assuming a curved shape corresponding to the curved pressing surface of the mold between the curved pressing surface of the mold and at least one surface of the stack, and
(d) applying pressure to the at least one surface of the stack and, during application of the pressure, employing the pressure dispersing medium positioned between the at least one surface of the stack and the curved pressing surface of the mold to disperse applied pressure against the at least one surface of the stack and thereby form the ballistic-resistant curved molded article.

2. The process according to claim 1, wherein step (d) comprises employing the pressure dispersing medium to disperse against two surfaces of the stack.

3. The process according to claim 1, wherein the pressure dispersing medium is a press-pad.

4. The process according to claim 1, wherein the pressure dispersing medium is a fluid in any one of an autoclave, a hydroclave or a diaphragm molding machine.

5. The process according to claim 1, wherein the ballistic-resistant curved molded article comprises at least one filler ply.

6. The process according to claim 1, wherein the ballistic-resistant curved molded article is a helmet shell or a radome.

7. The process according to claim 1, wherein the adhesive is present in the ballistic-resistant curved molded article in a total amount of less than 15.0 wt. %, based on the total weight of the molded article.

8. The process according to claim 1, wherein each layer of unidirectionally aligned polyolefin fibers is oriented at an angle of from 45° to 135° with respect to the orientation of an adjacent layer of unidirectionally aligned polyolefin fibers.

9. The process according to claim 1, wherein each layer of unidirectionally aligned polyolefin fibers is separated from an adjacent layer of unidirectionally aligned polyolefin fibers by a layer of adhesive.

10. A ballistic-resistant curved molded article obtained by the process according to claim 1.

11. A ballistic-resistant curved molded article which comprises:

a plurality of layers of unidirectionally aligned polyolefin fibers, wherein the layers are substantially absent of a bonding matrix; and a plurality of layers of adhesive disposed between adjacent layers of the unidirectionally aligned fibers, wherein the ballistic-resistant curved molded article has an areal density of at most 11 $Kgm^{-2}$ and meets NIJ level III+performance against 7.62×39 mm MSC (AK47).

12. The ballistic-resistant curved molded article according to claim 11, which further comprises at least one filler ply.

13. The ballistic-resistant curved molded article according to claim 11, which is a helmet shell or a radome.

14. The ballistic-resistant curved molded article according to claim 11, wherein the adhesive is present in the ballistic-resistant curved molded article in a total amount of less than 15.0 wt. %, based on the total weight of the molded article.

* * * * *